US011893374B2

(12) United States Patent
Ranjan

(10) Patent No.: US 11,893,374 B2
(45) Date of Patent: *Feb. 6, 2024

(54) LOW LATENCY DYNAMIC CONTENT MANAGEMENT

(71) Applicant: PayPal, Inc., San Jose, CA (US)

(72) Inventor: Sumit Ranjan, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,378

(22) Filed: Dec. 29, 2021

(65) Prior Publication Data

US 2022/0121438 A1     Apr. 21, 2022

Related U.S. Application Data

(63) Continuation of application No. 16/709,545, filed on Dec. 10, 2019, now Pat. No. 11,269,612.

(51) Int. Cl.
*G06F 9/44*     (2018.01)
*G06F 8/65*     (2018.01)
(Continued)

(52) U.S. Cl.
CPC ................ *G06F 8/65* (2013.01); *G06F 9/451* (2018.02); *H04L 65/4025* (2022.05);
(Continued)

(58) Field of Classification Search
CPC ....... G06F 8/65; G06F 9/451; H04L 65/4025; H04L 67/34; H04L 67/60; H04L 67/75
(Continued)

(56) References Cited

U.S. PATENT DOCUMENTS 7,076,553 B2    7/2006   Chan et al.
7,251,812 B1    7/2007   Jhanwar et al.
(Continued)

FOREIGN PATENT DOCUMENTS

| CN | 104123150 A | | 10/2014 | |
|---|---|---|---|---|
| GB | 2506575 A | * | 4/2014 | ....... G06F 17/30867 |
| WO | 2009073826 A1 | | 6/2009 | |

OTHER PUBLICATIONS

Arindam Mitra, "Design of a Content-Based Routing Architecture", 2002, University of Manitoba, Canada, 141 pages. (Year: 2002).*

(Continued)

*Primary Examiner* — Ted T. Vo
(74) *Attorney, Agent, or Firm* — Haynes and Boone, LLP

(57) ABSTRACT

Methods and systems are presented for providing low latency dynamic content updates to applications, by separating presentable content from the programming logic of an application. The programming code associated with the application without at least a portion of the presentable content may be released to an application hosting server for distributing to end-users. The presentable content may be published to a content delivery network separate from the application hosting server. Once the application is downloaded to a user device, the application may retrieve the presentable content from the content delivery network. The application may incorporate the retrieved presentable content into the application such that the presentable content would be presented on the user device as intended when the application is accessed.

20 Claims, 7 Drawing Sheets

(51) Int. Cl.
  *G06F 9/451* (2018.01)
  *H04L 67/00* (2022.01)
  *H04L 65/402* (2022.01)
  *H04L 67/60* (2022.01)
  *H04L 67/75* (2022.01)
(52) U.S. Cl.
  CPC .............. *H04L 67/34* (2013.01); *H04L 67/60* (2022.05); *H04L 67/75* (2022.05)
(58) Field of Classification Search
  USPC ................................................ 717/168–178
  See application file for complete search history.

(56) References Cited

U.S. PATENT DOCUMENTS

| | | | |
|---|---|---|---|
| 8,200,958 | B2 | 6/2012 | Coppola et al. |
| 8,345,869 | B2 | 1/2013 | Kahn et al. |
| 8,489,731 | B1 | 7/2013 | Gagliardi et al. |
| 8,868,737 | B2 | 10/2014 | Gagliardi et al. |
| 9,330,192 | B1 | 5/2016 | Greenberg et al. |
| 9,426,244 | B2 | 8/2016 | Wang et al. |
| 9,649,556 | B1 | 5/2017 | Curtis et al. |
| 9,762,695 | B2 * | 9/2017 | Ramnathkar ........... H04L 67/60 |
| 10,432,708 | B2 * | 10/2019 | Sherf ..................... H04N 21/00 |
| 10,841,353 | B2 | 11/2020 | Phillips et al. |
| 10,863,220 | B2 | 12/2020 | Peters et al. |
| 11,269,612 | B2 * | 3/2022 | Ranjan ................ H04L 65/4025 |
| 2004/0205555 | A1 | 10/2004 | Hind et al. |
| 2008/0059631 | A1 * | 3/2008 | Bergstrom ......... H04N 21/2402 709/224 |
| 2011/0078240 | A1 | 3/2011 | Sivasubramanian et al. |
| 2012/0317291 | A1 | 12/2012 | Wolfe |
| 2013/0254755 | A1 | 9/2013 | Yousouf et al. |
| 2016/0098261 | A1 | 4/2016 | Habib et al. |
| 2018/0121026 | A1 | 5/2018 | Nadig et al. |

OTHER PUBLICATIONS

Stack Overflow, "Magento CDN setup, how to update content?", 2016, retrieved from https://stackoverflow.com/questions/35383442/magento-cdn-setup-how-to-update-content , 2 pages (Year: 2016).*
Chris, "CDN Storage—Push Versus Pull", 2018, post on https://blog.cdnsun.com/cdn_storage/ , 3 pages (Year: 2018).*
Hanif Jetha, "Using a CDN to Speed Up Static Content Delivery", 2018, DigitalOcean, 10 pages. (Year: 2018).*
Dilley J., et al., "Globally Distributed Content Delivery", IEEE Internet Computing, Sep.-Oct. 2002, 9 pages.
Farooq F., "Deliver Your App's Dynamic Content Using Amazon CloudFront—Getting Started Template", In: AWS. Apr. 3, 2019, Retrieved on Feb. 6, 2021 (Feb. 6, 2021), https://aws.amazon.com/blogs/networking-and-content-delivery/deliver-your-apps-dynamic-content-using-amazon-cloudfront-getting-started-template/, entire document, 2 pages.
International Application No. PCT/US2020/064353, International Search Report and Written Opinion dated Mar. 26, 2021, 20 pages.
Salahuddin M., et al., "A Survey on Content Placement Algorithms for Cloud-Based Content Delivery Networks", Feb. 1, 2018, IEEE Access, 24 pages.
International Preliminary Report on Patentability for Application No. PCT/US2020/064353 dated Jun. 23, 2022, 10 pages.
Extended European Search Report dated Dec. 1, 2023 from related European Application No. 20898209.0, 9 pages.
Anonymous, "reflection—Is it possible to dynamically load a library at runtime from an Android application?—Stack Overflow—," Aug. 17, 2013 [online], [retrieved on Nov. 15, 2023], [Retrieved from the Internet], Retrieved from: <https://stackoverflow.com/questions/6857807/is-it-possible-to-dynamically-load-a-library-at-runtime-from-an-android-applicat>.

* cited by examiner

402 — en_US/add_card.properties card_number_edit_text="Enter your card number"
cvv_edit_text="Enter your CVV"
full_name="Enter your full name"
visa_card_image="http://paypalobjects.com/visa_card_image.png"

404 — fr_FR/add_card.properties card_number_edit_text="Entrez votre numéro de carte"
cvv_edit_text="Entrez votre CVV"
full_name="Entrez votre nom complet"
visa_card_image="http://paypalobjects.com/visa_card_image.png"

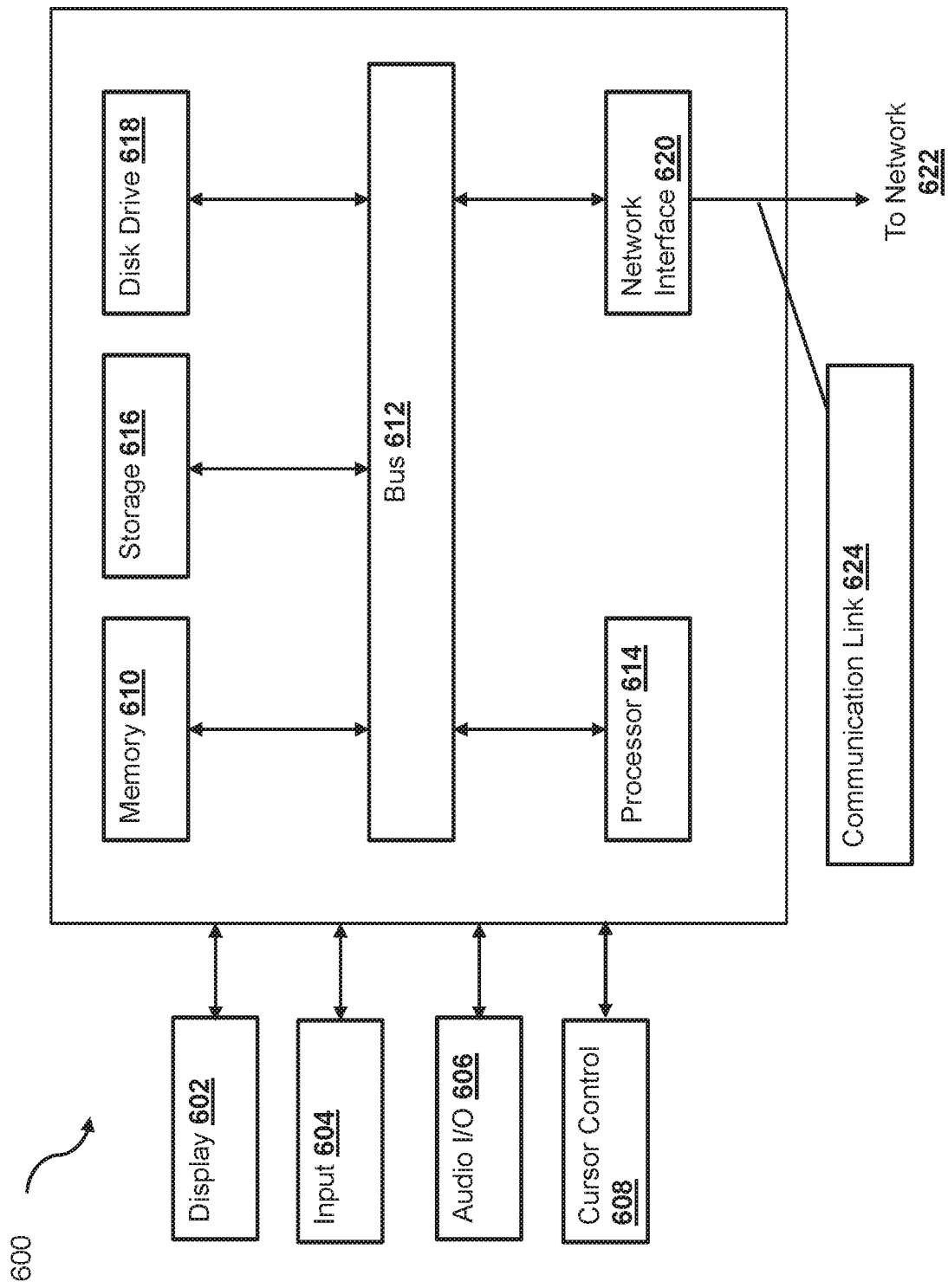

LOW LATENCY DYNAMIC CONTENT MANAGEMENT

CROSS REFERENCE TO RELATED APPLICATIONS

The present application is a continuation application of U.S. patent application Ser. No. 16/709,545, filed Dec. 10, 2019, and is incorporated in reference in its entirety.

BACKGROUND

The present specification generally relates to application management, and more specifically, to dynamically managing content updates for applications according to various embodiments of the disclosure.

RELATED ART

Even though web-based applications such as a website can be flexible, applications that run natively on devices (e.g., non-browser based applications such as mobile applications) may still be preferable in many instances. For example, native applications may provide functionalities, features, and user interface elements that are not limited by a web browser. Furthermore, applications that do not rely on a network connection usually run faster, and in some instances, may operate completely offline. However, managing applications can be challenging.

Since an application obtains at least some of the data, including the programming code and presentable content, locally on the device, the installation package for installing the application must include the programming code and the presentable content that may possibly be needed by the application. An application typically includes multiple versions of the same presentable content, such as different languages of the presentable content. As such, all of the different languages of the presentable content would be included in the installation package (and in any subsequent update packages) to be installed on a user device, even when only a subset of the presentable content is used by the end-user. This causes the installation package to be unnecessarily large in size, which causes inefficient use of memory space in the user devices and slower download speed.

Furthermore, any change to the data (even a minor change to the presentable content) requires an update to the application. The update process can be burdensome to both the application developer and the end users. First, the application developer may generate one or more new versions of the application corresponding to different device platforms (e.g., Apple iOS®, Google Android®, etc.), and may release the new versions of the application at one or more of the application hosting servers (e.g., Apple App Store®, Google Play®, etc.). In some instances, the application hosting servers may inspect the application, which may take hours or even days, before making the application available for download by end-users. The end-users are then required to download and update the application with the new versions. Not only that it requires a substantial amount of time (e.g., days or even weeks) for the updated content to become accessible by the end-users via this update process, the updated content may not be distributed to all end-users as some end-users may find frequent downloading and updating the mobile application too burdensome. Thus, there is a need for an improved mechanism for managing non-browser-based applications.

BRIEF DESCRIPTION OF THE FIGURES

FIG. 4A illustrates an example content file according to an embodiment of the present disclosure;

FIG. 4B illustrates another example content file according to an embodiment of the present disclosure;

FIG. 6 is a block diagram of a system for implementing a device according to an embodiment of the present disclosure.

Figure 1:
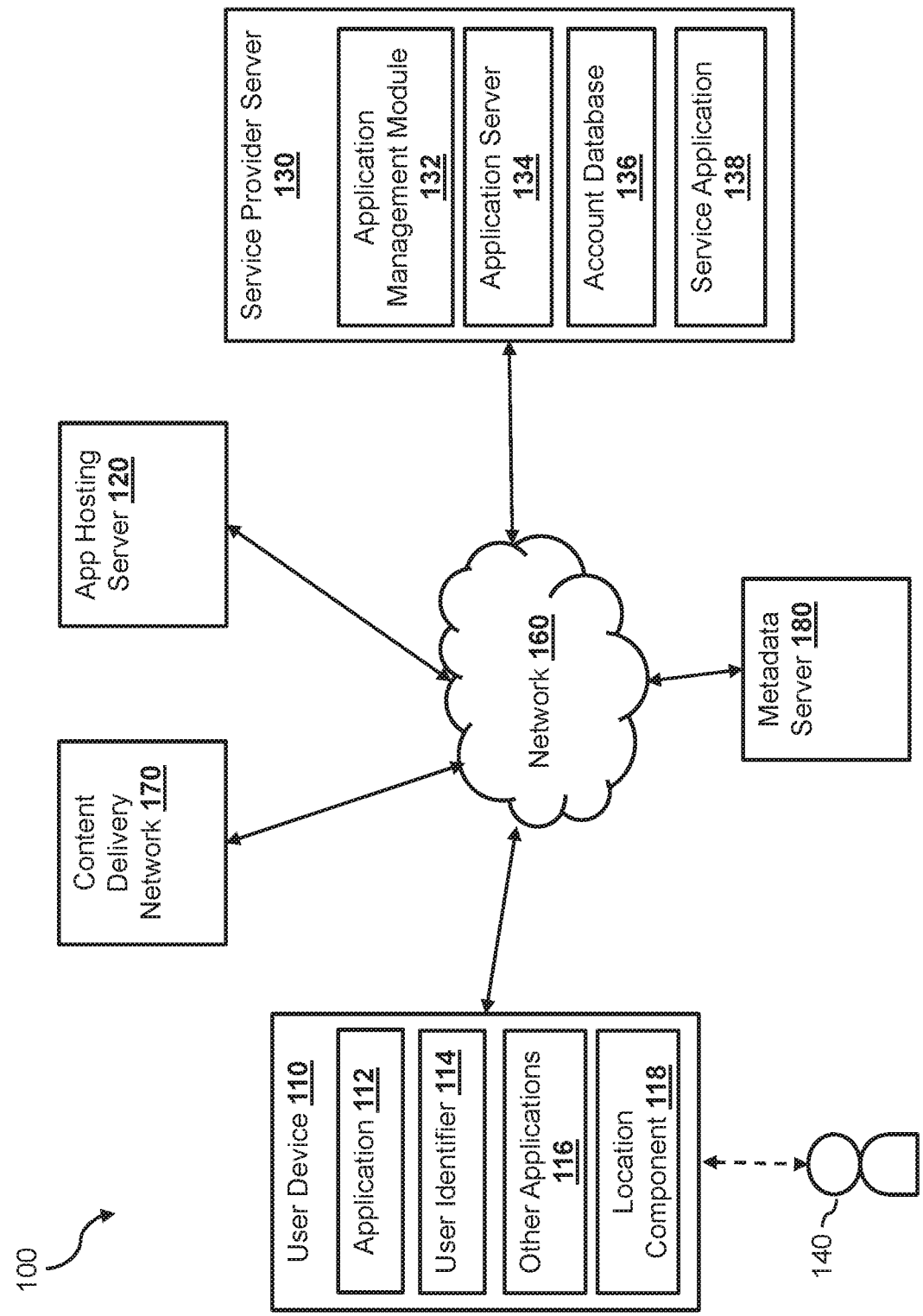
FIG. 1 is a block diagram illustrating an application management system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing low latency dynamic content updates to applications (e.g., mobile applications or other native non-browser-based applications) by separating presentable content from the programming logic of an application. As discussed above, conventional mechanisms for updating applications (e.g., even for a minor change to the presentable content of the application) require a release of a new version of the application, which may cause inefficient use of network bandwidth and memory space on the user device running the application. By separating presentable content from programming logic of the application, the presentable content may be independently updated without releasing a new version of the application.

According to various embodiments of the disclosure, an application management system may separate presentable content of an application (e.g., a mobile application) from remaining data (e.g., programming code that implements programming logic) of the application. For example, the presentable content and the programming code may be stored in different files or data structures. In some embodiments, the programming code may include placeholders at areas where presentable content is expected to be located (e.g., the portion(s) of the programming code associated with user interface pages of the application). The programming code may be configured to dynamically obtain the presentable content (e.g., from a data file on a device) when a corresponding user interface page is being rendered by the device.

The application management system may generate an application package associated with the application to be distributed to end-users. In some embodiments, the application management system may generate the application package based on the programming code of the application, without including at least a portion of the presentable content. The application management system may then release the application package to one or more application hosting servers (e.g., Apple App Store®, Google Play®, etc.) for distributing the application to end-users. The end-users may download the application package from the one or more application hosting servers, and may subsequently install the application on their devices (e.g., mobile devices). Since the application package is generated without at least a portion of the presentable content (e.g., the different forms of the same text such as in different languages, various multimedia files, etc.), the size of the application package can be substantially reduced. The reduced size enables more efficient use of memory space of the application on the user device and the network bandwidth, resulting in faster download time of the application package.

The application management system may also generate one or more content packages based on the presentable content associated with the application. In some embodiments, the application management system may generate multiple content packages corresponding to different presentable content for the same user interface pages associated with the application. For example, the application management system may generate or obtain presentable content in different languages (e.g., English, French, German, Spanish, Japanese, Chinese, etc.) for the same user interface pages of the application. Furthermore, the application management system may also generate or obtain presentable content for different demographics (e.g., for end-users under 20 years old, for end-users over 60 years old, for male end-users, for female end-users, etc.). The application may also generate or obtain presentable content for different display attributes (e.g., for different screen sizes, for different screen resolutions, etc.). The different presentable content, such as in different languages and/or for different demographics of the end-users, may be encapsulated in the different content packages. The application management module 132 may then release the one or more content packages to a content delivery network, that is separate from the application hosting servers that host the application package.

After downloading the application package to a user device, an end-user may install the application on the user device (e.g., by opening and executing the application package). The end-user may subsequently launch the application on the user device. In some embodiments, the application may be configured to determine whether at least a portion of presentable content associated with the application is missing. For example, launching the application or any other operations that the application performs (e.g., rendering a user interface page, receiving a user selection of a user interface element, etc.) may trigger such a determination process. In some embodiments, the application may search a portion of the memory of the user device (e.g., a portion of the permanent data storage such as a flash drive of the user device allocated for the application) for the presentable content associated with the application. In one non-limiting example, the application may have a list of content files associated with the application, and may determine whether all of the content files exist in the portion of the memory of the user device. If all of the content files in the list is found in the portion of the memory, the application may determine that there is no missing presentable content, and may continue its operations. However, if any one of the content files in the list is not found in the portion of the memory, the application may determine that at least some of the presentable content is missing.

When it is determined that at least some of the presentable content is missing (e.g., when the application was launched for the first time on a user device), the application of some embodiments may be configured to retrieve or otherwise obtain the missing presentable content from the content delivery network or other accessible source. In some embodiments, the content delivery network may include one or more content servers configured to serve presentable content associated with the application to end-users. The one or more content servers may be located at different geographical locations, and the one or more content packages may be stored in each of the one or more content servers. In some embodiments, when the content delivery network receives a request for the presentable content from a user device, the content delivery network may be configured to route the request to one of the one or more content servers (e.g., one that is physically closest to the user device, etc.) for servicing the request. For example, when the application installed on the user device determines that at least some of the presentable content is missing, the application may submit a request for presentable content to the content delivery network. The content delivery network may route the request from the user device to one of the one or more content servers that is closest to the user device for servicing the content. Using the content server that is closest to the user device to service the content request from the user device may improve the speed of processing the content request (e.g., the speed of downloading the presentable content to the user device). In some embodiments, the content server may provide presentable content to the user device based on the request. For example, the request may specify all of the presentable content associated with the application, or only the content that is missing in the user device.

In some embodiments, the application may be configured to obtain one or more attributes from the user device, and include the one or more attributes in the request for presentable content. For example, the application may determine a device attribute, such as a geographical location of the user device, a default language used in the user device, a screen size of the user device, a resolution of the user device, etc. The application may also determine a user attribute of the end-user, such as a gender, an age, a user preference, an education level, etc.

When a content server receives the request for presentable content that includes the one or more attributes from the user device, the content server may transmit a subset of the one or more content packages to the user device based on the one or more attributes. As discussed herein, the application management system may release different content packages associated with presentable content for the application, where the different content packages may correspond to different languages of the presentable content, and/or presentable content designed for different end-users (e.g., for different genders, different age groups, etc.). Thus, the content server may select only a subset of the one or more stored content packages that is relevant to the end-user (e.g., the content package corresponding to a language applicable to the end-user based on the device attributes, etc.) and transmit the subset of the one or more content packages to the user device. The application may store the received content packages in the portion of the memory of the user device allocated for the application, and may access the content packages when needed (e.g., when a user interface page is rendered on the user device, etc.). By downloading only the subset of the content packages that is applicable to the end-user, it minimizes the amount of data required to download to the user device (and stored on the user device) for the application to operate.

As discussed herein, each content package may include presentable content for different user interface pages associated with the application. In some embodiments, the content server that receives the request for presentable content may determine an order of the presentable content for transmitting to the user device. For example, the content server may first determine a first user interface page associated with the application (e.g., a home user interface page, a login user interface page, etc.) that is currently accessed by the end-user. Based on the first user interface page, the content server may determine a degree of connectivity between the first user interface page and each one of the other one or more user interface pages associated with the application. For example, the content server may determine that a second user interface page and a third user interface page have a first degree of connectivity with the first user interface page since the second user interface page and the third user interface page can be accessed directly from the first user interface page (e.g., the first user interface page includes links to both of the second and third user interface pages). The content server may also determine that a fourth user interface page has a second degree of connectivity with the first user interface page since the fourth user interface page can be accessed from either the second user interface page or the third user interface page, and so forth. Thus, a particular user interface page has a Nth level of connectivity with the first user interface page when a user can access the particular user interface from the first user interface page after performing Nth hops (e.g., N number of clicks, through N−1 number of other user interface pages) The content server may then determine an order of the presentable content based on the degrees of connectivity with the first user interface page, such that the portions of the presentable content associated with the user interface pages having a lower degrees of connectivity with the first user interface page is ordered in front of the portions of the presentable content associated with the user interface pages having a higher degrees of connectivity with the first user interface page. The content server may then transmit the portions of the presentable content to the user device based on the determined order. This way, the portions of the presentable content that are more likely to be accessed by the end-user (e.g., based on the current user interface page being accessed by the user device) will be transmitted to the user device before the other portions of the presentable content. As different portions of the presentable content are received by the application, the application may store the portions of the presentable content in the memory space of the user device that is allocated to the application, such that the presentable content may be accessed by the application when the corresponding user interface page(s) is accessed. Thus, when the end-user accesses the second user interface page (e.g., by clicking on a link of the first user interface page), the programming code of the application may access the portion of the presentable content associated with the second user interface page stored on the user device, and integrate the portion of the presentable content within the second user interface page.

The application may be updated from time to time. For example, the application developer may introduce a new functionality or change an existing functionality of the application by changing the programming logic of the application. The application management system may obtain a new version of the application and may release the new version of the application to the one or more application hosting servers. As discussed above, depending on the application hosting servers, it may take hours or even days before the new version of the application becomes available for download by the end-users.

The application developer may also update the application by changing the presentable content (e.g., by updating text, images, or other multi-media associated with one or more user interface pages of the application). Since the presentable content is separated from the programming logic of the application, the application management system does not need to release a new version of the application based on the updates to the presentable content. Instead, the application management system may push the updates of the presentable content to the content delivery network. In some embodiments, the application installed on the user devices may be configured to check whether an updated version of the presentable content is available in the content delivery network. If it is determined that an updated version of the presentable content is available, the application may be configured to retrieve the updated version of the presentable content, and store the updated version of the presentable content on the user device.

In some embodiments, instead of generating and releasing an updated version of the presentable content, the application management system may determine differences between the updated version of the presentable content and a previous version of the presentable content, and may release only the differences (e.g., a delta) between the two versions to the content delivery network to reduce the size of the update. Thus, the application management system may generate one or more update content packages based on the determined differences between the new and the previous versions of the presentable content (where each content package may correspond to a different form, such as a different language or a different targeted demographic), and may upload the one or more update content packages to the content delivery network.

When the application submits a request for updated presentable content to the content delivery network, the request may include one or more attributes (e.g., a device attribute, a user attribute), and may also include information indicating a version of the presentable content currently installed on the user device. Upon receiving the request for updated presentable content from the user device, the content server may select a subset of the update content packages based on the attributes and the current version information included in the request, and may transmit the selected subset of the update content packages to the user device. The application may be configured to install the subset of the update content packages by updating the presentable content stored on the user device based on the update information (e.g., the deltas) in the update content packages. Using the content delivery network to deliver updated presentable content to the application allows the application management system to bypass the application release/update process through the application hosting servers. Furthermore, since only the subset of the update content packages applicable to the end-user is downloaded (instead of the entire library of content packages) and the update content packages only includes differences of the presentable content, the amount of data required to be downloaded to the user device is minimized, which improves the speed of updating the application.

In some embodiments, the application management system may provide a metadata server for managing versions of the presentable content. The metadata server may be separate from the content delivery network. Each time the application management system pushes out updated presentable content (e.g., a new version of the presentable content) to the content delivery network, the application management system may also send information related to the update (e.g., the new version information, etc.) to the metadata server. The application installed on the user devices may be configured to use the metadata server to determine whether the presentable content stored on the user devices is out of date. For example, the application may be configured to submit an update determination request to the metadata server (e.g., periodically such as every day or every week, triggered by an action of the application such as launching of the application, etc.), where the update determination request may include version information associated with the presentable content currently stored on the user device. The metadata server may then determine whether the current version of the presentable content stored on the user device is out of date based on the information included in the request. The metadata server may transmit a signal indicating whether there is a need to update the presentable content to the application. Based on the signal, the application may determine whether to submit an update content request to the content delivery network for retrieving updates to the presentable content associated with the application.

FIG. 1 illustrates an online system 100, within which the application management system, the content delivery network, and the metadata server may be implemented according to one embodiment of the disclosure. The online system 100 includes a service provider system 130, a content delivery network 170, an application hosting server 120, a metadata server 180, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the application hosting server 120, the service provider system 130, the content delivery network 170, and the metadata server 180 over the network 160. For example, the user 140 may use the user device 110 to download an application (e.g., the application 112) that is associated with the service provider server 130 from the application hosting server 120. For example, the application 112 may be a mobile application that is configured to run on a particular operating system platform (e.g., iOS®, Android®, etc.). In one implementation, the application 112 includes a software program (e.g., a mobile application) that provides a graphical user interface (GUI) for the user 140 to interface and communicate with the service provider system 130 via the network 160. When the application 112 is launched, the application 112 may be configured to retrieve presentable content for the application 112 from the content delivery network 170, such that the application 112 may provide user interface pages to the user 140. The user 140 may then use the mobile application 112 to interact with the service provider server 130 (e.g., logging in to a user account, performing a transaction such as an online payment transaction, etc.). The mobile application 112 may also submit requests to the metadata server 180 to determine whether an updated version of the presentable content is available in the content delivery network. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, may include at least one identifier 114, which may be implemented, for example, an IP address, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider system 130 via the network 160, and the identifier 114 may be used by the service provider system 130 to associate the user with a particular user account (e.g., and a particular profile) maintained by the service provider system 130.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. For example, location information may be obtained by checking in using the user device 110 via a check-in device at a location or in an authentication process to determine if a request coming from the user device 110 is fraudulent or valid.

Even though only one user device 110 is shown in FIG. 1, it has been contemplated that one or more user devices (each similar to user device 110) may be communicatively coupled to the network 160 within the system 100.

The application hosting server 120, in various embodiments, may be maintained by a business entity associated with a computer system platform (e.g., Apple® for iOS®, Google® for Android®, etc.). The application hosting server 120 may host various applications that may be developed by the business entity and/or developed by third-party developers such as the service provider associated with the service provider server 130 for download by end-users. Examples of the application hosting server 120 may include AppStore® and Google Play®. In some embodiments, the application hosting server 120 may provide a user interface such that end-users such as the user 140 may use their user devices (e.g., the user device 110) to browse and/or search applications hosted by the application hosting server 120 and download the applications (e.g., the application 112) to the user devices. The application hosting server 120 may also provide notifications indicating that a new version (e.g., an updated version) of the application is available for download.

The content delivery network 170, in various embodiments, may include one or more content servers that are located in different geographical areas. The content delivery network 170 may host content for various entities, such as hosting presentable content associated with the application 112 for the service provider server 130. In some embodiments, each of the content servers may be configured to communicate with various applications (e.g., the application 112, a web browser, etc.) via one or more communication protocols (e.g., REST APIs, HTTP, etc.). When a request for content is received at the content delivery network (e.g., from the application 112 of the user device 110), the content delivery network may automatically route the request to one of the content servers closest to the user device that initiated the request. The content server may then serve (e.g., transmit) content to the user device based on the request.

The metadata server 180 may be associated with the service provider server 130, and may store presentable content versioning information. For example, each time the service provider server 130 releases updated presentable content for the application 112, the service provider server 130 may transmit a notification, which includes a version number of the updated presentable content, to the metadata server 180. In some embodiments, the metadata server 180 may be configured to communication with various applications (e.g., the application 112, a web browser, etc.) via one or more communication protocols (e.g., REST APIs, HTTP, etc.). When a request for checking availability of updated content is received (e.g., from the application 112 of the user device 110), the metadata server 180 may determine whether the version of the presentable content on the user device 110 is up-to-date (e.g., a current version) based on the versioning information stored on the metadata server 180.

The service provider system 130, in one embodiment, may be maintained by a service provider, which may provide services (e.g., account services, payment services, transaction services, information services, etc.) to end-users such as the user 140. In some embodiments, the service provider system 130 may include a service application 138, which may be adapted to process transactions for users, such as facilitate the searching, selection, purchase, payment of items, and/or other services offered by the service provider system 130. In one example, the service provider system 130 may be provided by PayPal®, Inc., of San Jose, CA, USA, and/or one or more service entities or a respective intermediary that may provide multiple point of sale devices at various locations to facilitate transaction routings between merchants and, for example, service entities.

The service provider system 130 may also include an application server 134 that is configured to interact with applications installed on user devices, such as the application 112. For example, the application server 134 may be configured to interact with the application 112 via a predetermined online communication protocol (e.g., REST API, HTTP, etc.). In some embodiments, the application server 134 may receive transaction requests (e.g., a payment request, a purchase request, etc.) from the application 112. In response to receiving the receiving the transaction requests, the application server 134 may process the transaction requests or use the service application 138 to process the transaction requests.

The service provider system 130, in one embodiment, may be configured to maintain one or more user accounts in an account database 136, each of which may be associated with a profile and may include account information associated with one or more individual users (e.g., the user 140 associated with user device 110). For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the profile matching module 132 to match profiles to the entity. In certain embodiments, account information also includes user purchase profile information such as account funding options and payment options associated with the user, payment information, receipts, and other information collected in response to completed funding and/or payment transactions.

Figure 2:
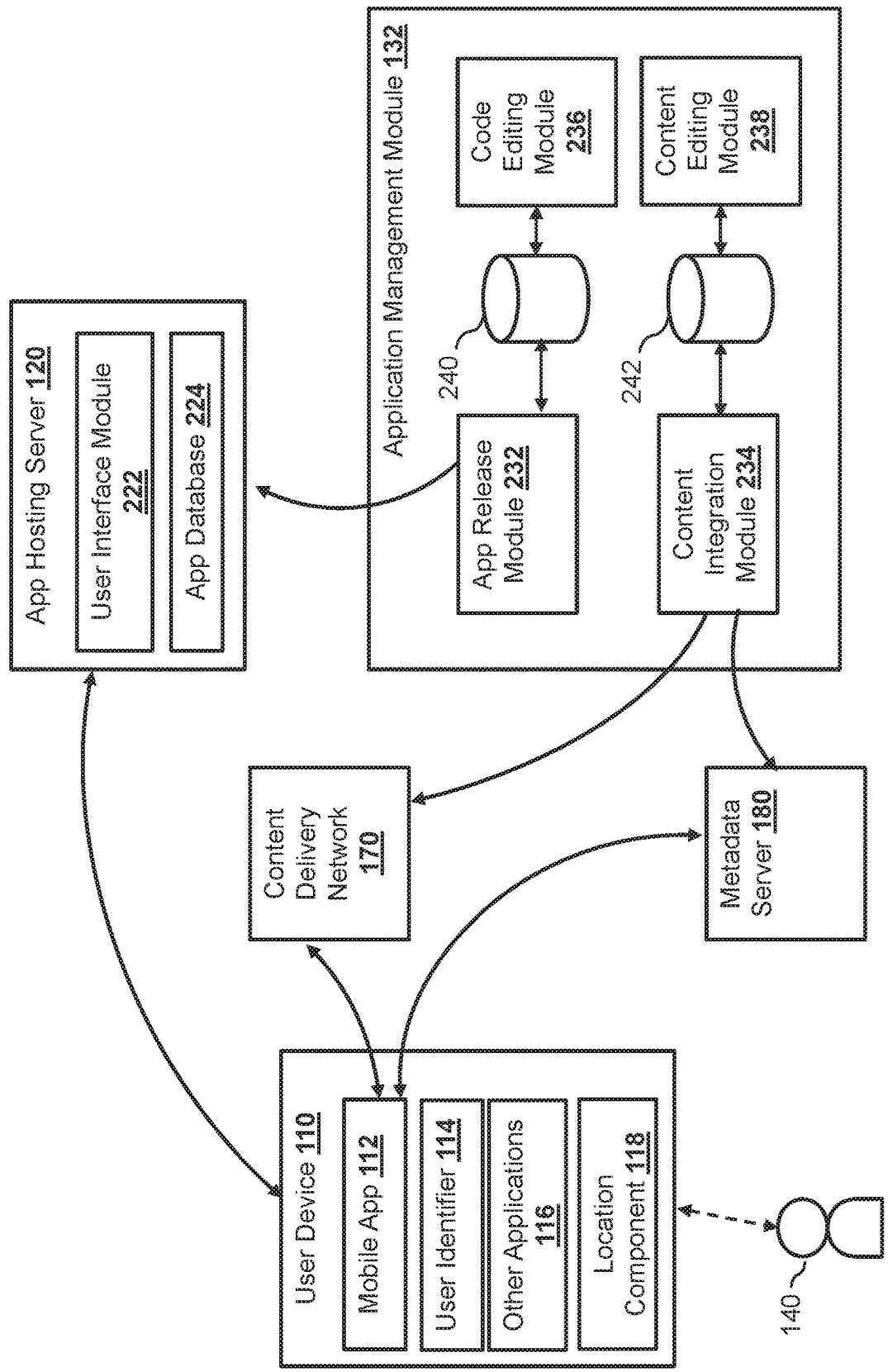
FIG. 2 is a block diagram illustrating an application management module according to an embodiment of the present disclosure.

In various embodiments, the service provider system 130 includes an application management module 132 that implements the application management system as discussed herein. In some embodiments, the application management module 132 may provide low latency dynamic presentable content update to applications by separating at least a portion of the presentable content associated with an application from the remaining of the application. FIG. 2 illustrates a block diagram of the application management module 132 according to an embodiment of the disclosure. The application management module 132 may include an application release module 232, a content integration module 234, a code editing module 236, a content editing module 238, a code database 240, and a content database 242.

In some embodiments, the code editing module 236 of the application management module 132 may enable an application developer to develop a software application, such as the application 112, for example, by providing a code editing interface. The code editing interface may allow the application developer to add, remove, and/or modify programming code associated with the application 112. In some embodiments, the programming code may implement programming logic associated with the application 112 and user interface pages of the application 112. For example, the application 112 may include multiple user interface pages that may be linked with each other. The multiple user interface pages may include a home user interface page (e.g., a default user interface page when the application is launched), a login page for logging the user in to a user account, an account summary page, one or more transaction pages, etc. Each user interface page may include presentable content such as text, images, videos, or other multimedia content. As the programming code of the application 112 is developed, the code editing module 236 may allow the application developer to insert placeholders or tags (e.g., card_number_edit_text, #cvv_edit_text, etc.) at places where presentable content and/or references to presentable content should be placed.

The content editing module 238 of the application management module 132 may enable a content developer to generate content for the application 122, for example, via a content editing interface. For example, the content developer may generate different content files for the different user interface pages associated with the application 122. Each content file may specify the actual presentable content associated with the placeholders and/or tags included in the programming code of a corresponding user interface page. For example, a content file may specify that the tag #card_number_edit_text refers to the text "Enter your card number." When the programming code associated with a user interface page that includes the placeholders or tags is executed (e.g., running on a user device such as the user device 110, etc.), the application 112 may access a content file to retrieve the actual presentable content for the user interface page.

Thus, the actual text associated with the user interface pages need not be included within the programming code of the application 112, thereby separating at least some of the presentable content from the programming logic of the application 112. Furthermore, using the placeholders or tags in place of the actual references to presentable content allows different forms of presentable content (e.g., different languages, for different demographics, or different hardware configurations, etc.) to be rendered at runtime. For example, the content developer may develop different content files for the same user interface page, wherein the different content files may include presentable content in different languages, for different display configurations, for different demographics, etc. As the programming code is executed, the application 112 of some embodiments may select to use one of the content files for retrieving the actual presentable content based on one or more factors (e.g., a device attribute such as default language used, a screen size or resolution, etc.).

Figure 3A:
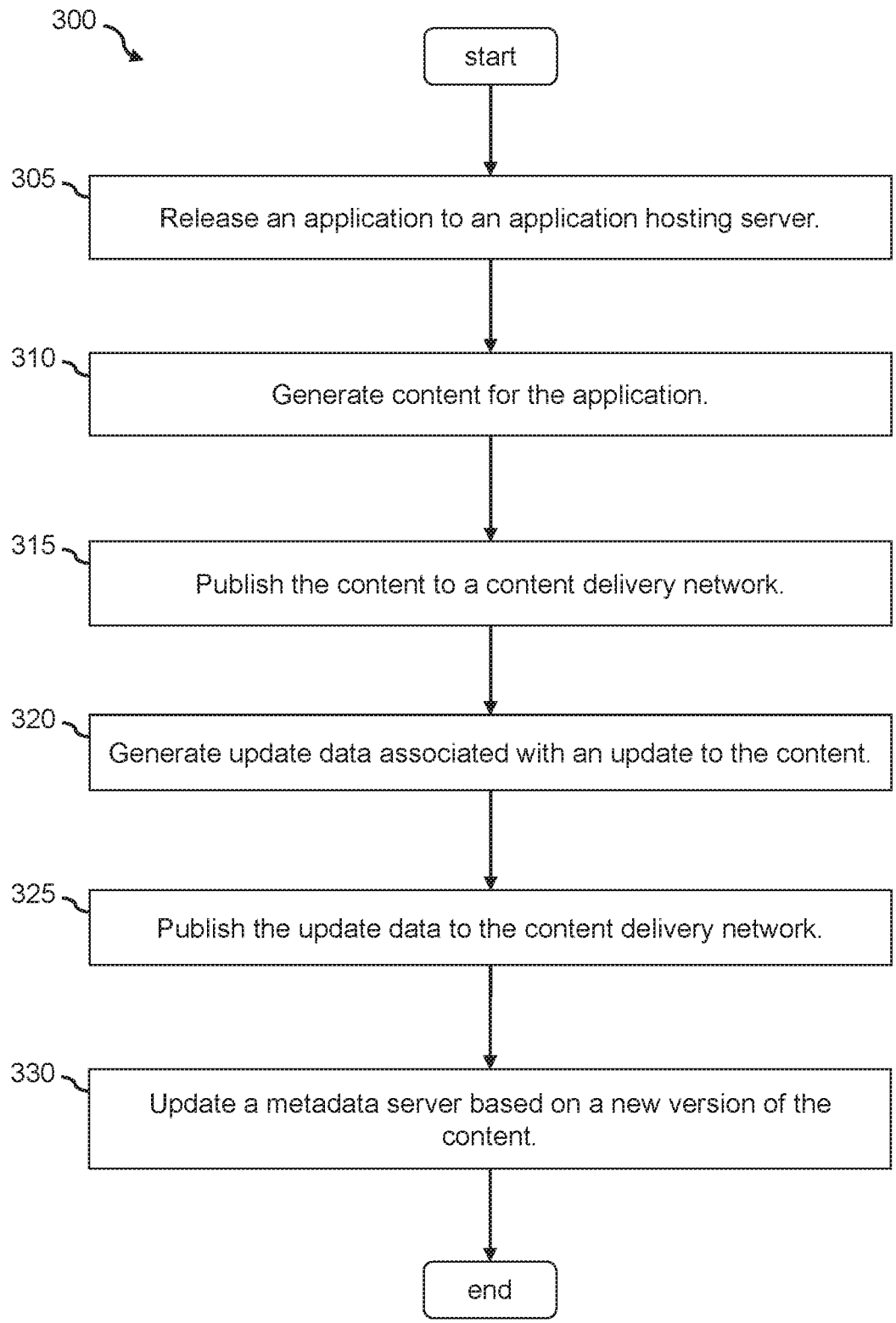
FIG. 3A is a flowchart showing a process of providing low latency dynamic update to presentable content for an application from a server-side perspective according to an embodiment of the present disclosure.

FIG. 3A illustrates a server-side process 300 for providing low latency dynamic updates to presentable content for an application according to one embodiment of the disclosure. In some embodiments, the process 300 may be performed by the application management module 132 of the service provider system 130, the content delivery network 170, and/or the metadata server 180, though is not limited to being performed by these components. Process 300 begins by releasing (at step 305) an application to an application hosting server. For example, as discussed herein, the code editing module 236 of the application management module 132 may enable an application developer to develop a software application, such as the application 112, for example, by providing a code editing interface. The code editing module 236 may store the programming code in the code database 240. When the application 112 is developed, the application management module 132 may generate an application package based on the programming code stored in the code database 240. Since the programming code refers to external presentable content by including placeholders or tags instead of references to the actual presentable content, the application package is generated without including at least a portion of the presentable content. The application release module 232 may then release the application package to the application host server 120 by transmitting the application package to the application host server 120.

The application hosting server 120 may store the application package, along with other application packages from the application management module 132 or from other servers, in the application database 224. In some embodiments, the application hosting server 120 includes a user interface module 222 configured to provide a user interface for users, such as the user 140, such that the users can interact with the application hosting server 120 (e.g., to browse or otherwise access the application packages). For example, the user 140 may use a web browser of the user device 110 or a proprietary application (not shown) associated with the application hosting server 120 to access the application hosting server 120. In some embodiments, the user interface module 222 may also enable the user 140 to download one or more applications (e.g., the application 122) stored in the application database 224.

The process 300 then generates (at step 310) content for the application. For example, as discussed herein, the content editing module 238 of the application management module 132 may enable a content developer to generate content for the application 122, for example, via a content editing interface. The content developer may generate different content files for the different user interface pages associated with the application 122. Each content file may specify the actual presentable content (or references, such as an address, to the actual presentable content) associated with the placeholders and/or tags included in the programming code of a corresponding user interface page. In some embodiments, the content developer may generate different content files for the same user interface page, wherein each of the different content files may correspond to a different language, a different display hardware configuration, a different targeted demographic, etc.

FIG. 4A illustrates an example content file 402 corresponding to a particular user interface page (e.g., a payment card adding page) of the application 112. As shown, the content file 402 includes a title (or a file name)—"en_US/add_card.properties." The title of the content file 402 specifies the user interface page for which the presentable content is intended (e.g., for the add_card user interface page). The title of the content file 402 may also specify a particular attribute of the presentable content. For example, the code "en_US" refers to United States English, and the title including the code "en_US" may specify that the content file 402 includes the U.S. English version of the presentable content for the add_card user interface page. The content file 402 includes multiple key-value pairs, where the keys are associated with the placeholders or tags included in the programming code associated with the user interface page, and the values are associated with the actual presentable content for the corresponding keys. For example, the content file 402 specifies the actual presentable text "Enter your card number" for the tag "card_number_edit_text" and the actual presentable text "Enter your CVV" for the tag "cvv_edit_text." Thus, when the programming code associated with the add_card user interface page is executed, the application 112 that accesses the content file 402 may incorporate the values in the key-value pairs in the add_card user interface page.

FIG. 4B illustrates another example content file 404 corresponding to the same user interface page (e.g., a payment card adding page) of the application 112 as the content file 402, as indicated by the title of the content file 404—"fr_FR/add_card.properties." However, as the title indicates, the content file 404 includes the French version, instead of the English version, of the presentable content for the add_card user interface page. The content file 404 also includes multiple key-value pairs. While the keys are the same keys included in the content file 402, the values in the content file 404 may be different than the values in the content file 402. For example, the content file 404 specifies the actual presentable text "Entrez votre numéro de carte" for the tag "card_number_edit_text" and the actual presentable text "Entrez votre CVV" for the tag "cvv_edit_text." Thus, when the programming code associated with the add_card user interface page is executed, the application 112 that accesses the content file 404 may incorporate the values in the key-value pairs in the add_card user interface page.

In some embodiments, the application management module 132 may separate at least a portion of the presentable content associated with the application 112 from the remaining of the application 112 (e.g., the programming code that implements the programming logic of the application 112). For example, the content editing module 238 may be configured to store the content files in the content database 242, separate from the code database 240. Furthermore, as discussed herein, the application package generated by the application release module 232 may not include all of the presentable content (does not include at least the presentable content in the content files stored in the content database 242), which substantially reduces the size of the application package. Thus, the application package released to the application hosting server 120 may have missing presentable content.

The process 300 then publishes (at step 315) the content to a content delivery network. For example, instead of including the presentable content in the application package that is released to the application hosting server 120, the application management module 132 may publish the presentable content to a content delivery network 170, that is separate from the application hosting server 120. In some embodiments, the content integration module 234 may generate a content package based on the content files stored in the content database 242. The content package may include all of the content files corresponding to the different languages, different display hardware configurations, different demographics, etc., for the user interface pages associated with the application 112.

Figure 5:
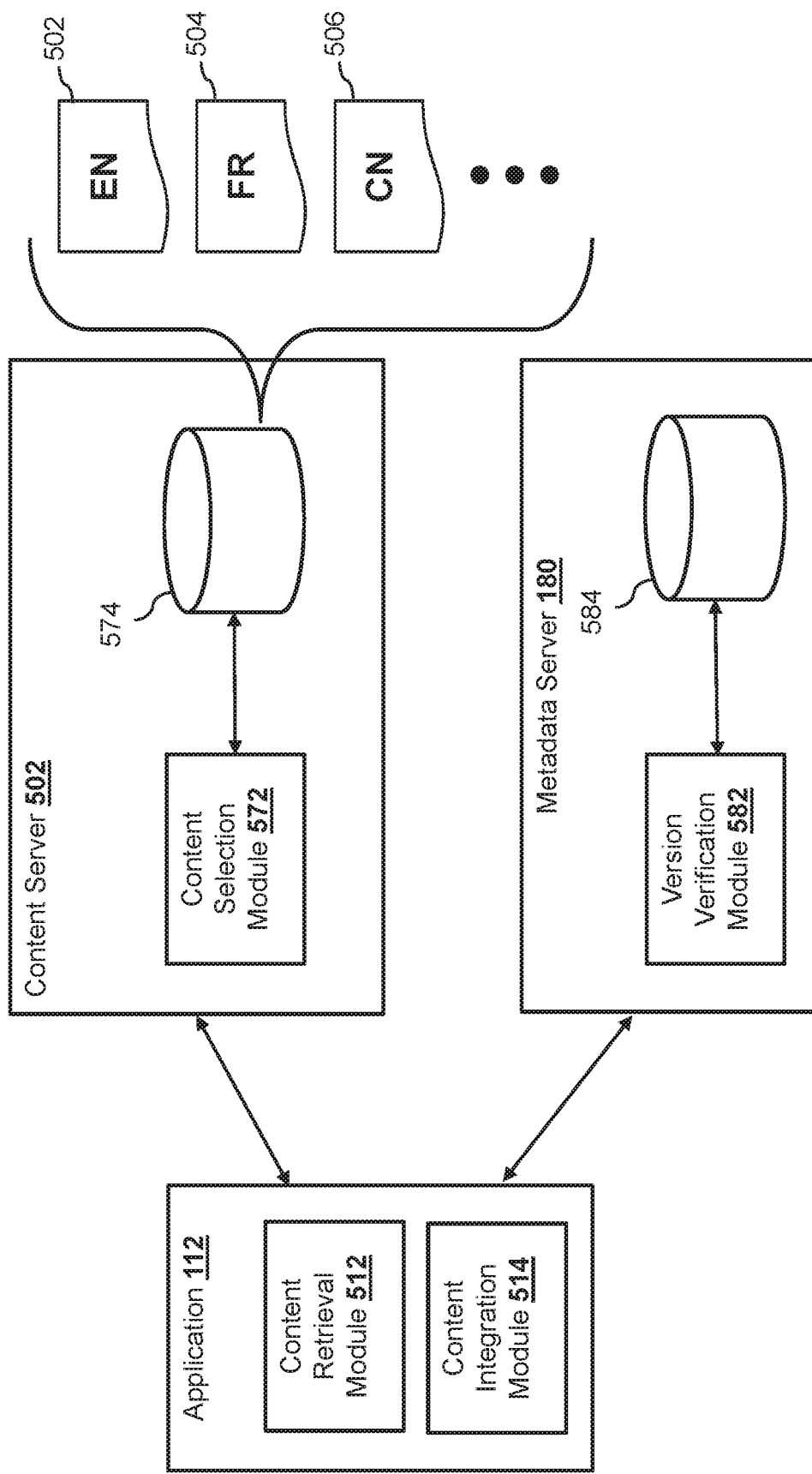
FIG. 5 illustrates interactions between an application, a content server, and a metadata server for delivery dynamic content for the application according to an embodiment of the present disclosure.

As discussed herein, the content delivery network 170 may include one or more content servers. The content servers may be located in different geographical locations for serving content to user devices at the corresponding regions. In some embodiments, the content delivery network 170 may be configured to distribute the content files of the content package to each of the content servers. FIG. 5 illustrates an example content server 502 according to one embodiment of the disclosure. As shown, the content server 502 includes a content selection module 572 and a content database 574. Upon receiving the content package (or the content files within the content package), the content server 502 may store the content files, such as the content files 502-506, in the content database 574. In this example, the content files stored in the content database 574 include content files corresponding to different languages for the application 112. For example, the content file 502 stores presentable content in English while the content file 504 stores presentable content in French, and the content file 506 stores the presentable content in Chinese. In some embodiments, the content files stored in the content database 574 may include additional content files corresponding to different attributes, such as content files corresponding to different display hardware configurations (e.g., different screen sizes, different screen resolutions, etc.) and/or different user attributes (e.g., different genders, different age groups, etc.).

Once the application package is released to the application hosting server 120, the application package is ready to be accessed and/or downloaded by end-users. For example, the user 140 may use the user device 110 to access application packages (including the application package generated for the application 112) hosted by the application hosting server 120. In some embodiments, the user interface module 222 of the application hosting server 120 may provide a user interface (e.g., a webpage, a user interface from a proprietary application associated with the application hosting server 120 such as an AppStore® mobile application, etc.) that enables users, such as the user 140 to search/browse application hosted by the application hosting server 120, and select one or more applications to be downloaded. Thus, the user 140 may access and download the application package associated with the application 112 via the user interface provided by the user interface module 222. Once the application package is downloaded on the user device 110, the user device 110 may install the application 112 on the user device 110 by executing the application package. The user device 110 may then launch the application 112 by executing the programming code of the application 112. However, as discussed herein, since the application package may not include all of the presentable content associated with the application 112, the application 112 may have missing presentable content that prevents the application 112 to operate as intended. Thus, the user device 110 needs to retrieve at least a portion of the presentable content associated with the application 112 before the user device 110 can run the application 112.

Figure 3B:
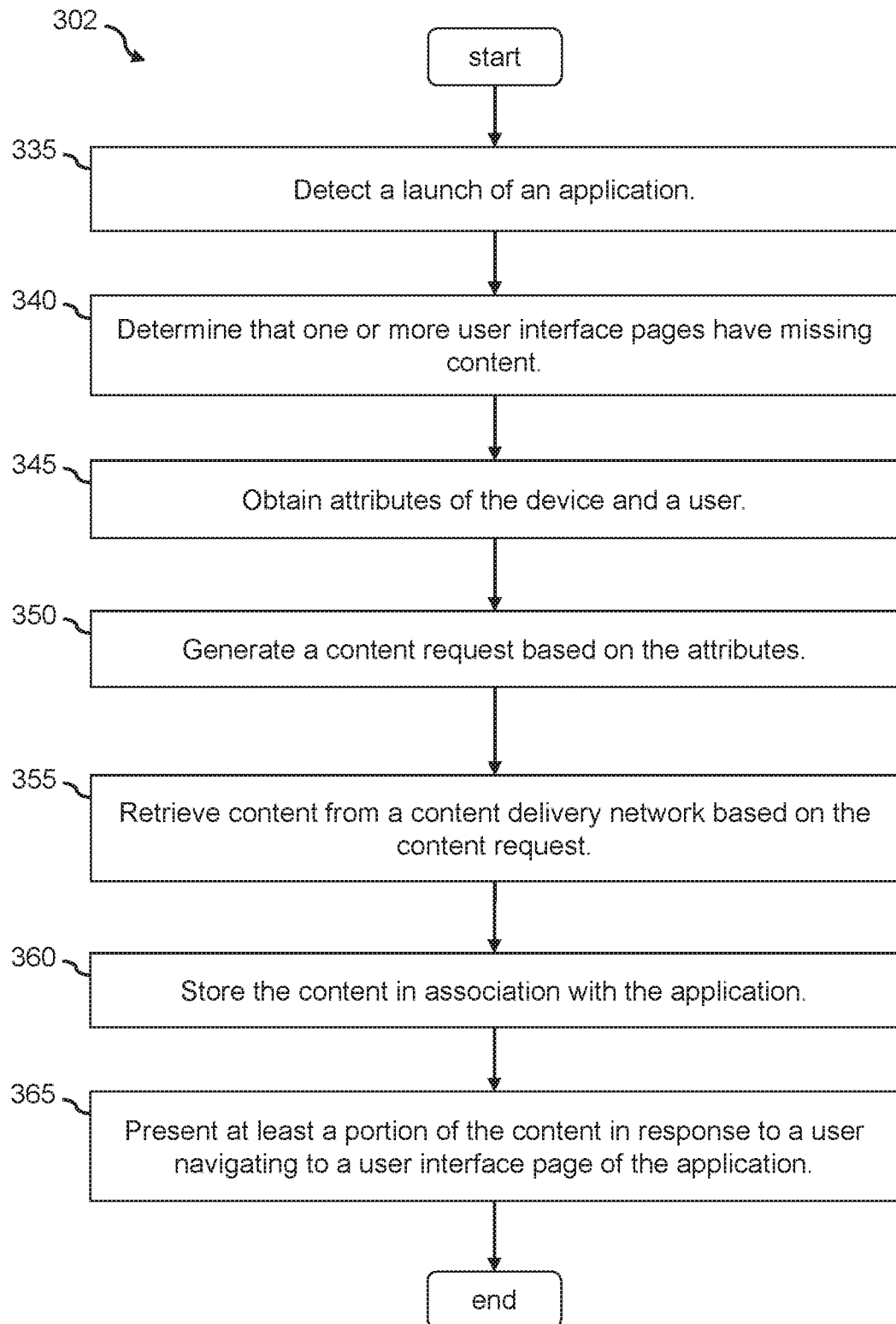
FIG. 3B is a flowchart showing a process of providing low latency dynamic update to presentable content for an application from a client-side perspective according to an embodiment of the present disclosure.

FIG. 3B illustrates a client-side process 302 for providing low latency dynamic updates to presentable content for an application according to one embodiment of the disclosure. In some embodiments, the process 302 may be performed by the user device 110 (specifically the application 112 of the user device 110), though is not limited to being performed by these components. The process 302 begins by detecting (at step 335) a launch of an application. For example, when the application 112 is launched by the user device (e.g., by the user 140 selecting a representation such as an icon associated with the application 112 on a user interface of the user device 110), the application 112 may detect the launch as the programming code of the application 112 is being executed. The process 302 then determines (at step 340) that one or more user interface pages have missing content. For example, the application 112 may have a list of required content files (e.g., a content file for a default language, a content file for each user interface page, etc.). The application 112 may search on the memory space of the user device 110 allocated to the application 112 (e.g., a partition such as a folder structure allocated to the application 112 in the permanent storage device such as a flash drive or a hard drive of the user device 110) for the required content files. If the application 112 finds all of the required content files in the memory space (e.g., in the folder structure), the application 112 may determine that there is no missing content for the application 112. However, if the application 112 cannot find all of the required content files in the memory space, the application 112 may determine that there is missing content for the application 112 as not all of the presentable content required by the application 112 is stored locally on the user device 110.

When it is determined that there is missing content, the process 302 obtains (at step 345) attributes of the device and a user of the device, and generates (at step 350) a content request based on the attributes. For example, the content retrieval module 512 of the application 112 may obtain device attributes of the user device 110, such as at least one of a default language used in the user device 110 (e.g., obtained from an operating system of the user device 110), a geographical location of the user device 110 (e.g., obtained from the location component 118 of the user device 110), a display hardware configuration (e.g., a display size and/or a screen resolution obtained from the operating system of the user device 110), or other attributes associated with the user device 110. In some embodiments, the content retrieval module 512 may also obtain user attributes of the user 140 of the user device 110, such as an age, a gender, an interest, etc. (e.g., obtained from a profile of the user 140 stored on the user device 110). The content retrieval module 512 may generate a content request based on an identifier of the application 112 and one or more of the attributes.

The process 302 then retrieves (at step 355) content from a content delivery network based on the content request. For example, the content retrieval module 512 of the application 112 may transmit the content request to the content delivery network 170. The content delivery network 170 may route the content request to one of the content servers (e.g., the content server 502). In some embodiments, the content delivery network 170 may route the content request to a content server that is located closest to a location of the user device 110 (e.g., based on an Internet Protocol address used by the user device 110 when the content request is transmitted). Upon receiving the content request, the content selection module 572 of the content server 502 may select content files from the content database 574 for serving the user device 110. For example, based on the application identifier included in the content request, the content selection module 572 may filter out content files associated with applications other than the application 112. In some embodiments, the content selection module 572 may further filter out irrelevant content files based on the attributes included in the content request. For example, based on a device attribute indicating that the language used by the user device 110 is English, the content selection module 572 may filter out content files corresponding to languages other than English. Similarly, the content selection module 572 may continue to filter out other irrelevant content files based on other types of attributes included in the content request, and select a subset of the content files associated with the application 112 for responding to the content request. The content server 502 may then transmit the selected subset of the content files to the application 112 of the user device 110. In some embodiments, the determination that there is missing content in the application and the retrieving of the content files from the content delivery network 170 may be performed by the application 112 automatically without requiring a user interaction with the application 112. For example, the retrieval of missing content may be triggered by an operation of the application 112 (e.g., a launch of the application 112 on the user device 110, an access to a particular user interface page of the application 112, logging on to an account using the application 112, etc.). By selecting only a subset of content files (e.g., relevant content files based on the attributes) to transmit to the user device 110, bandwidth efficiency and memory efficiency of the user device is improved (e.g., only a portion of the content files is transmitted to and stored on the user device 110 locally).

In some embodiments, before transmitting the subset of content files to the user device 110, the content server 502 may determine an order of the presentable content for transmitting to the user device 110. For example, the content server 502 may first determine a first user interface page associated with the application 112 (e.g., a home user interface page, a login user interface page, etc.) that is currently accessed by the user 140. Based on the first user interface page, the content server 502 may determine a degree of connectivity between the first user interface page and each one of the other one or more user interface pages associated with the application 112. For example, the content server 502 may determine that a second user interface page and a third user interface page have a first degree of connectivity with the first user interface page since the second user interface page and the third user interface page can be accessed directly from the first user interface page (e.g., the first user interface page includes links to both of the second and third user interface pages). The content server 502 may also determine that a fourth user interface page has a second degree of connectivity with the first user interface page since the fourth user interface page can be accessed from either the second user interface page or the third user interface page, and so forth. The content server 502 may then determine an order of the presentable content based on the degrees of connectivity with the first user interface page, such that the portions of the presentable content associated with the user interface pages having a lower degrees of connectivity with the first user interface page is ordered in front of the portions of the presentable content associated with the user interface pages having a higher degrees of connectivity with the first user interface page. For example, the content server 502 may determine an order—presentable content for the first user interface page, presentable content for the second user interface page, presentable content for the third user interface page, presentable content for the fourth user interface page, and so forth. The content server 502 may then transmit the portions of the presentable content to the user device 110 based on the determined order. This way, the portions of the presentable content that are more likely to be accessed by the user 140 (e.g., based on the current user interface page being accessed by the user device) will be transmitted to the user device 110 before the other portions of the presentable content.

As different portions of the presentable content are received by the application, the application 112 may store the portions of the presentable content in the memory space of the user device 110 that is allocated to the application 112, such that the presentable content may be accessed by the application 112 when the corresponding user interface page(s) is accessed. Thus, when the user 140 accesses the second user interface page (e.g., by clicking on a link of the first user interface page), the programming code of the application 112 may access the portion of the presentable content associated with the second user interface page stored on the user device, and integrate the portion of the presentable content within the second user interface page. In some embodiments, the user 140 may access the user interface pages for which presentable content has been downloaded, while presentable content for other user interface pages may not have been downloaded (e.g., still in transmission, etc.). For example, once the presentable content for the second user interface page is downloaded on the user device 110, the application 112 may present the second user interface page based on the presentable content associated with the second user interface page while the presentable content associated with the third user interface page and/or the fourth user interface page is still not downloaded to the user device 110.

The process 302 then stores (at step 360) the content in association with the application and presents (at step 365) at least a portion of the content in response to a user navigating to a user interface page of the application. For example, upon receiving the content files from the content server 502, the application 112 may store the content files in the memory space (e.g., the folder structure) allocated to the application 112 in the user device 110, such that the application 112 may subsequently access the content files. In some embodiments, the presentable content associated with the user interface pages that are not currently accessed by the user device 110 (not being displayed) may be downloaded and stored on the user device 110. When a user interface page of the application 112 is accessed by the user device (e.g., the user 140 navigates to the user interface page of the application 112), the content integration module 514 may integrate presentable content from one or more of the content files into the programming code associated with the user interface page as the user interface page is being rendered on the user device 110, such that the presentable content associated with the user interface page is rendered as intended on the display of the user device 110.

As discussed herein, the programming code associated with a user interface page may include placeholders or tags in place of actual presentable content (e.g., text) or references to actual presentable content (e.g., links to an image, an audio, or other multimedia content, etc.). During execution of the programming code, the content integration module 514 may substitute the placeholders or tags with actual presentable content or references to actual presentable content based on the content files stored locally on the user device. For example, the content integration module 514 may search the content file(s) for the key that corresponds to a placeholder or a tag, and may use the value corresponding to the key to substitute the placeholder or the tag in the programming code. In an example where the user 140 navigates to an add card user interface page of the application 112, the programming code of the add card user interface page may include the tag #card_number_edit_text for instructing the user to enter a credit card number in a data input field and the tag #cvv_edit_text for instructing the user to enter a CVV number of the credit card in another data input field. Upon determining the two tags in the programming code, the content integration module 514 may look into the content file associated with the add card user interface page (e.g., the content file 402) and find the key "card_number_edit_text" in the content file 402 that matches the tag "#card_number_edit_text." The content integration module 514 may then use the value corresponding to the tag "Enter your card number" to substitute the tag in the programming code before the user interface page is rendered on the user device 110, such that the presentable content (e.g., the text "Enter your credit card number") is presented as intended on the user device 110. As the user 140 navigates to different user interface pages of the application 112, the content integration module 514 may continue to integrate presentable content from the content files into the programming code of the application 112 such that the presentable content is displayed on the user device 110.

The application 112 may be updated from time to time. For example, the application developer may introduce a new functionality or change an existing functionality of the application 112 by changing the programming logic of the application 112, for example, via the user interface provided by the code editing module 236. The code editing module 236 may store the updated application (e.g., a new version of the application 112) in the code database 240. The application release module 232 may then release the new version of the application 112 to the one or more application hosting servers, such as the application hosting server 120. As discussed above, depending on the application hosting servers, it may take hours or even days before the new version of the application 112 becomes available for download by the end-users.

The application developer may also update the application 112 by changing the presentable content (e.g., by updating text, images, or other multi-media associated with one or more user interface pages of the application 112), for example, via the user interface provided by the content editing module 238. Since the presentable content is separated from the programming logic of the application 112, the application management module 132 does not need to release a new version of the application based on the updates to the presentable content. Instead, the application management module 132 may push the updates of the presentable content to the content delivery network. Referring back to FIG. 3A, the process 300 generates (at step 320) update data associated with an update to the content and publishes (at step 325) the update data to the content delivery network. For example, the content editing module 238 may store the updated content in the content database 242. The content integration module 234 may then generate a content update package based on the updated content, and may publish the content update package through the content delivery network 170. In some embodiments, the content delivery network 170 may distribute the content update package to each of its content servers, such as the content server 502.

In some embodiments, the application 112 installed on the user device 110 may be configured to check whether an updated version of the presentable content is available in the content delivery network. If it is determined that an updated version of the presentable content is available, the content retrieval module 512 of the application 112 may be configured to retrieve the updated version of the presentable content, and store the updated version of the presentable content on the user device.

In some embodiments, instead of generating and releasing an updated version of the presentable content (e.g., all of the content files with the updated presentable content), the content integration module 234 may determine differences between the updated version of the presentable content and a previous version of the presentable content, and may release only the differences (e.g., a delta) between the two versions to the content delivery network to reduce the size of the update package. Thus, the content integration module 234 may generate the content update package based on the determined differences between the new and the previous versions of the presentable content, where the content update package may include one or more update files and where each of the one or more update files correspond to differences between the new version and the previous version of the presentable content corresponding to an attribute (e.g., a particular language, a particular demographic, a particular display hardware configuration, etc.). The content integration module 234 may upload the content update package to the content delivery network 170.

When the application 112 submits a request for updated presentable content to the content delivery network 170, the request may include one or more attributes (e.g., one or more device attributes, one or more user attributes, etc.), similar to the content request submitted in step 350. The request for updated presentable content may also include information indicating a version of the presentable content currently installed on the user device 110 (e.g., the version of the presentable content that was initially downloaded to the user device 110 may be assigned version 1.0, any subsequent update to the presentable content will be assigned as subsequent version such as 2.0, 2.5, 3.0 etc. by the content integration module 234).

Upon receiving the request for updated presentable content from the user device 110, the content server 502 may select a subset of the update files included in the content update packages based on the attributes and the current version information included in the request (e.g., when the most up-to-date version of the presentable content is two or more versions ahead of the current version of the presentable content stored on the user device 110, multiple content update packages may be required) and the attributes included in the request. The content server 502 may then transmit the subset of update files to the user device 110. The application 112 may be configured to install the update files by updating the presentable content stored on the user device based on the update information (e.g., the deltas) in the update files. Using the content delivery network 170 to deliver updated presentable content to the application allows the application management module 132 to bypass the application release/update process through the application hosting server 120. Furthermore, since only the subset of the update files applicable to the user 140 is downloaded (instead of the entire library of update files in the content packages) and the update files only include differences of the presentable content, the amount of data required to be downloaded to the user device is minimized, which improves the speed of updating the application 112.

In some embodiments, the application management module 132 may provide a metadata server (e.g., the metadata server 180) for managing versions of the presentable content and alleviate traffic directed to the content delivery network 170. The metadata server 180 may be separate from the content delivery network 170. Each time the application management module 132 pushes out updated presentable content (e.g., a new version of the presentable content) to the content delivery network 170, the application management module 132 may also send information related to the update (e.g., the new version number, etc.) to the metadata server 180. The application 112 installed on the user devices may be configured to use the metadata server 180 to determine whether the presentable content stored on the user device 110 is out of date. For example, the application 112 may be configured to submit an update determination request to the metadata server 180 (e.g., periodically such as every day or every week, triggered by an action of the application such as launching of the application, etc.), where the update determination request may include version information associated with the presentable content currently stored on the user device 110. The metadata server 180 may then determine whether the current version of the presentable content stored on the user device 110 is out of date based on the information included in the request. The metadata server 180 may transmit a signal indicating whether there is a need to update the presentable content to the application 112. Based on the signal, the application 112 may determine whether to submit an update content request to the content delivery network 170 for retrieving updates to the presentable content associated with the application.

FIG. 6 is a block diagram of a computer system 600 suitable for implementing one or more embodiments of the present disclosure, including the service provider system 130, the application hosting server 120, the content servers of the content delivery network 170, the metadata server 180, and the user device 110. In various implementations, the user device 110 may include a mobile cellular phone, personal computer (PC), laptop, wearable computing device, etc. adapted for wireless communication, and each of the service provider system 130, the application hosting server 120, the content servers of the content delivery network 170, and the metadata server 180 may include a network computing device, such as a server. Thus, it should be appreciated that the devices 110, 120, 170, 180, and 130 may be implemented as the computer system 700 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the presentable content updating functionalities described herein according to the processes 300 and 302.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled with the non-transitory memory and configured to read instructions from the non-transitory memory to cause the system to perform operations comprising:
   pushing an update package associated with presentable content of an application to a content delivery network, wherein the presentable content is associated with one or more user interface pages of the application;
   determining that at least a portion of the update package pushed to the content delivery network is absent from an instance of the application running on a computing device, the instance of the application including at least programming code for navigating through the one or more user interface pages; and
   causing the instance of the application to retrieve the at least the portion of the update package from the content delivery network without requiring a user interaction with the instance of the application.

2. The system of claim 1, wherein the operations further comprise generating the update package prior to the pushing.

3. The system of claim 2, wherein the operations further comprise determining a difference between a first version of the presentable content and a second version of the presentable content, and wherein the generating the update package is based on the difference.

4. The system of claim 1, wherein the update package comprises one or more update files, each of the one or more update files corresponding to an attribute.

5. The system of claim 4, wherein the attribute includes one or more of a language, a demographic, or a display hardware configuration.

6. The system of claim 1, wherein the operations further comprise sending, to a metadata server, information for managing different versions of the presentable content.

7. The system of claim 6, wherein the information is usable by the metadata server to determine that a particular version of the presentable content stored on the instance of the application running on the computing device is out of date.

8. The system of claim 6, wherein the determining that the at least the portion of the update package is absent from the instance of the application is based on the information.

9. The system of claim 1, wherein the operations further comprise:
   selecting, among a plurality of portions of the update package, the at least the portion of the update package for the instance of the application based on at least one of a language attribute associated with the computing device, a geographical location of the computing device, or a display hardware configuration of the computing device.

10. A non-transitory machine-readable medium having stored thereon machine-readable instructions executable to cause a machine to perform operations comprising:
    determining that at least a portion of presentable content data stored on a content delivery network and corresponding to one or more user interface pages of an application is absent from an instance of the application running on a computing device, the instance of the application including at least programming code for navigating through the one or more user interface pages;
    in response to determining that the at least the portion of the presentable content data stored on the content delivery network is absent from the application, generating a content request for the instance of the application;
    transmitting the content request to the content delivery network to cause a retrieval of the at least the portion of the presentable content data stored on the content delivery network by the computing device without requiring a user interaction with the instance of the application; and
    storing the at least the portion of the presentable content data on the computing device.

11. The non-transitory machine-readable medium of claim 10, wherein the at least the portion of the presentable content data comprises one or more update files, each of the one or more update files corresponding to an attribute.

12. The non-transitory machine-readable medium of claim 11, wherein the attribute includes one or more of a language, a demographic, or a display hardware configuration.

13. The non-transitory machine-readable medium of claim 10, wherein the operations further comprise:
    determining that a particular version of the presentable content data stored on the computing device is out of date based on periodic update determination requests sent to a metadata server by the instance of the application.

14. The non-transitory machine-readable medium of claim 10, wherein a metadata server receives information related to updates of the presentable content data from the content delivery network to the metadata server.

15. The non-transitory machine-readable medium of claim 10, wherein the content request is generated based on at least one of a language attribute associated with the computing device, a geographical location of the computing device, or a display hardware configuration of the computing device.

16. A method, comprising:
    pushing an update package associated with presentable content of an application to a content delivery network, wherein the presentable content is associated with one or more user interface pages of the application;
    determining that at least a portion of the update package pushed to the content delivery network is absent from an instance of the application running on a computing device, the instance of the application including at least programming code for navigating through the one or more user interface pages; and
    causing the instance of the application to retrieve the at least the portion of the update package from the content delivery network without requiring a user interaction with the instance of the application.

17. The method of claim 16, further comprising:
    determining a difference between a first version of the presentable content and a second version of the presentable content; and
    generating wherein the update package is based on the difference.

18. The method of claim 16, wherein the update package comprises one or more update files, each of the one or more update files corresponding to an attribute, and wherein the attribute includes one or more of a language, a demographic, or a display hardware configuration.

19. The method of claim 16, further comprising sending, to a metadata server, information for managing different versions of the presentable content, wherein the information is usable by the metadata server to determine that a particular version of the presentable content stored on the instance of the application running on the computing device is out of date.

20. The method of claim 19, wherein the determining that the at least the portion of the update package is absent from the instance of the application is based on periodic update determination requests sent to the metadata server by the instance of the application.

* * * * *